United States Patent
Levenhagen et al.

(10) Patent No.: US 7,744,800 B2
(45) Date of Patent: Jun. 29, 2010

(54) METHOD AND APPARATUS FOR CONTROLLING THE STACKING HEIGHT OF STACKABLE PRODUCTS DURING COMPRESSION MOLDING OFF STOPS

(75) Inventors: Thomas E. Levenhagen, Elizabethtown, PA (US); Charles E. Kappelt, Linesville, PA (US)

(73) Assignee: Molded Fiber Glass Companies, Ashtabula, OH (US)

( * ) Notice: Subject to any disclaimer, the term of this patent is extended or adjusted under 35 U.S.C. 154(b) by 1211 days.

(21) Appl. No.: 11/326,901

(22) Filed: Jan. 6, 2006

(65) Prior Publication Data

US 2007/0158876 A1    Jul. 12, 2007

(51) Int. Cl.
*B29C 59/02*    (2006.01)
(52) U.S. Cl. ............... 264/320; 264/319; 264/318; 425/141; 425/139
(58) Field of Classification Search .......... 264/319, 264/318, 40.5, 297.4; 425/812, 407, 408, 425/141, 150, 139
See application file for complete search history.

(56) References Cited

U.S. PATENT DOCUMENTS

| 5,011,398 A * | 4/1991 | VanRens ............ 425/444 |
| 2005/0017391 A1 * | 1/2005 | Kobayashi et al. ...... 264/46.4 |
| 2005/0161862 A1 * | 7/2005 | Westerlund et al. ..... 264/259 |

* cited by examiner

*Primary Examiner*—Khanh Nguyen
*Assistant Examiner*—Saeed M Huda
(74) *Attorney, Agent, or Firm*—Renner, Otto, Boisselle & Sklar, LLP

(57) ABSTRACT

Method and apparatus for controlling the stacking height of stackable products during compression molding off stops includes slides that are movable into and out of an end of blind pockets in a compression mold in which the stack height surfaces are formed during the molding cycle. The slides are held in a retracted position until after the mold is closed and the molding compound flows to the shape of the molding cavity inside the mold including the blind pockets. Then the slides are extended into the ends of the respective blind pockets the same distance to compress the molding compound and obtain the desired height of the stack height surfaces formed by the blind pockets.

10 Claims, 6 Drawing Sheets

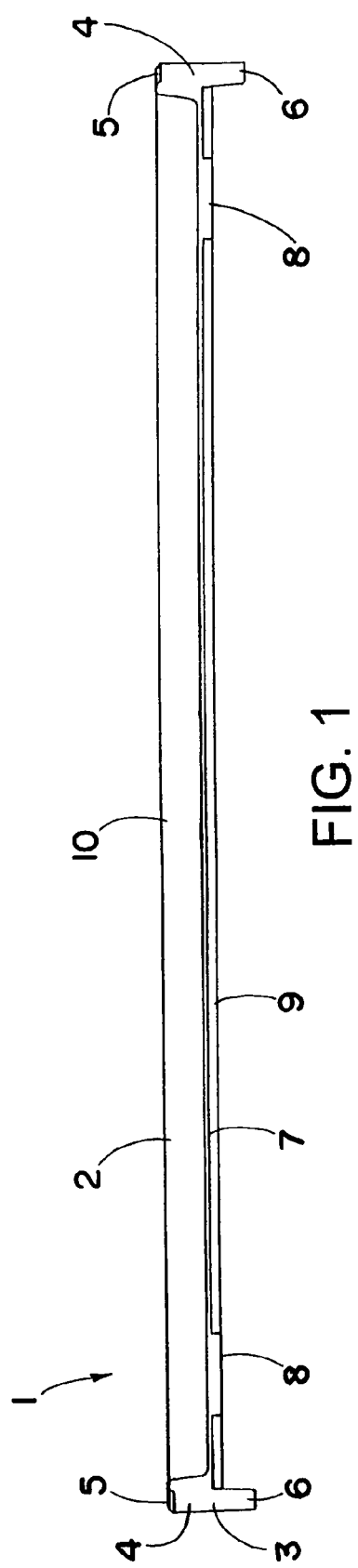
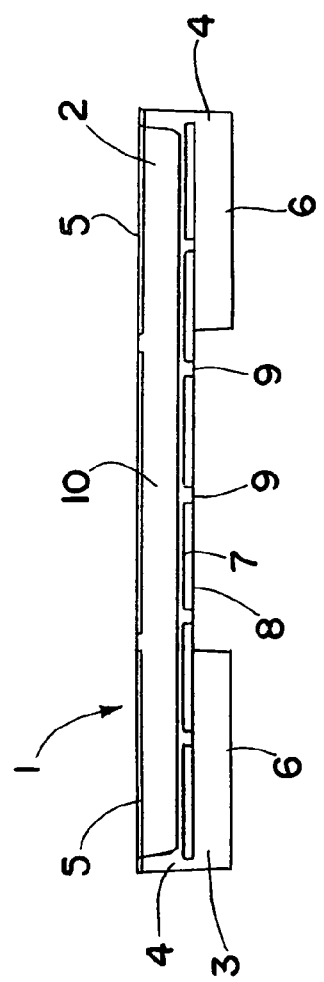
FIG. 1
FIG. 2

METHOD AND APPARATUS FOR CONTROLLING THE STACKING HEIGHT OF STACKABLE PRODUCTS DURING COMPRESSION MOLDING OFF STOPS

FIELD OF THE INVENTION

This invention relates generally to a method and apparatus for precisely controlling the stacking height of stackable products during compression molding of the products off stops.

BACKGROUND OF THE INVENTION

Stackable products or parts including for example trays and tote boxes or the like may be compression molded off stops out of a suitable plastic material such as fiberglass reinforced plastic. Compression molding off stops has the advantage that all of the molding pressure acts directly on the molding compound during the molding process, causing the molding compound to flow freely to better fill out the mold. However, some applications that use such compression molded stackable products in automated machinery or the like may require that the stacking height tolerances of the products be very precise, for example, on the order of ±0.004 inch. Heretofore it was not possible to hold the tolerances on thickness related details including the stacking height much higher than ±0.020 inch during compression molding of such products off stops due to the variables of charge weight and density combined with the compression molding procedure of molding off stops. Even small inconsistencies in the stacking heights of such products may be a problem especially if large numbers of the products are stacked one on top of another for handling by automated machinery.

SUMMARY OF THE INVENTION

The present invention provides the freedom of material flow obtained by compression molding stackable products or parts off stops and the local thickness control of the stack height surfaces of each product within a desired high tolerance, independent of press inaccuracies and inconsistent charge weight and density.

In accordance with one aspect of the invention, the compression molding method and apparatus utilizes slides that are retracted during the initial mold closure to insure that the compression forces acting on the molding compound inside the mold cause the molding compound to freely flow throughout the mold cavity including into blind pockets that form the product stack height surfaces. Then the slides are extended a precise distance into an end of the blind pockets to compress an end of each stack height surface to make the height or thickness of all of the stack height surfaces very precise, independent of press inaccuracies and inconsistent charge weight and density.

In accordance with another aspect of the invention, the slides have substantially the same perimeter shape/footprint as the ends of the stack height surfaces compressed thereby, creating high pressure areas at the ends of the stack height surfaces which densify the molding compound to minimize non-fills and porosity in the stack height surfaces and virtually eliminate porosity at the ends of the stack height surfaces for increased strength at the areas of greatest wear. This minimizes or substantially eliminates scrap and secondary operations that were previously required to patch non-fills and porosity of the stack height surfaces.

In accordance with another aspect of the invention, the slides provide efficient venting control of any trapped air from the blind pockets through the clearance space between the slides and mold cavity block. This substantially eliminates dieseling of any combustible vapors that might otherwise become trapped in the blind pockets.

In accordance with another aspect of the invention, the extension of the slides into the blind pockets during the molding cycle may be limited by push back pins on a common travel plate for all of the slides contacting stops located on the movable mold half when the mold is closed during the molding cycle.

In accordance with another aspect of the invention, the stops on the movable mold half may be shimmible to adjust the height of the product stack height surfaces during extension of the slides into the blind pockets after the mold is closed.

In accordance with another aspect of the invention, before the mold is opened, the pressure acting on the slides may be relaxed in order to keep the molded product/part in the cavity half of the mold during opening of the mold. After the mold is fully open, the slides may be extended further to eject the product from the mold.

These and other objects, advantages, features and aspects of the invention will become apparent as the following description proceeds.

To the accomplishment of the foregoing and related ends, the invention, then, comprises the features hereinafter more fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

The present invention may be more readily understood by reference to the following drawings in which:

FIG. 1 is a schematic side elevation view of a stackable product in the form of a tray having a plurality of stacking legs whose height may be precisely controlled during compression molding of the product off stops using the method and apparatus of the present invention;

FIG. 2 is an end elevation view of the stackable product of FIG. 1 as seen from either end thereof;

DETAILED DESCRIPTION

Figure 3:
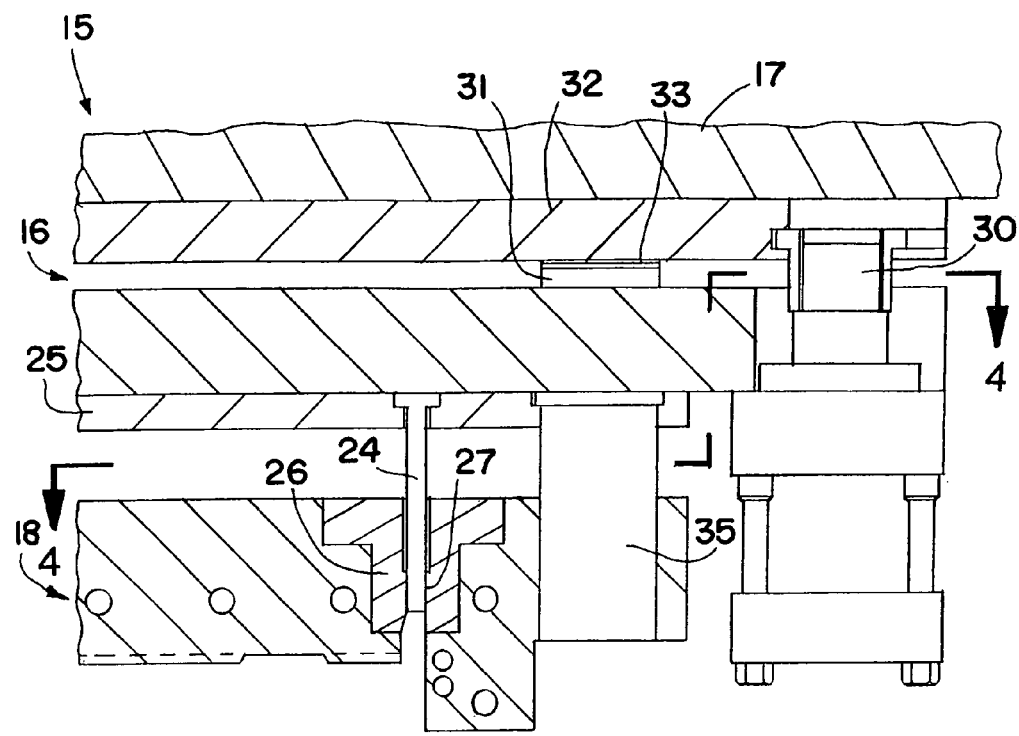
FIG. 3 is a fragmentary section through one form of apparatus of the present invention which may be used to compression mold the stackable product of FIGS. 1 and 2 off stops, including a compression mold mounted in a hydraulic press, the mold being shown in the open position with a charge of molding compound centered on the lower mold half.
Figure 3:
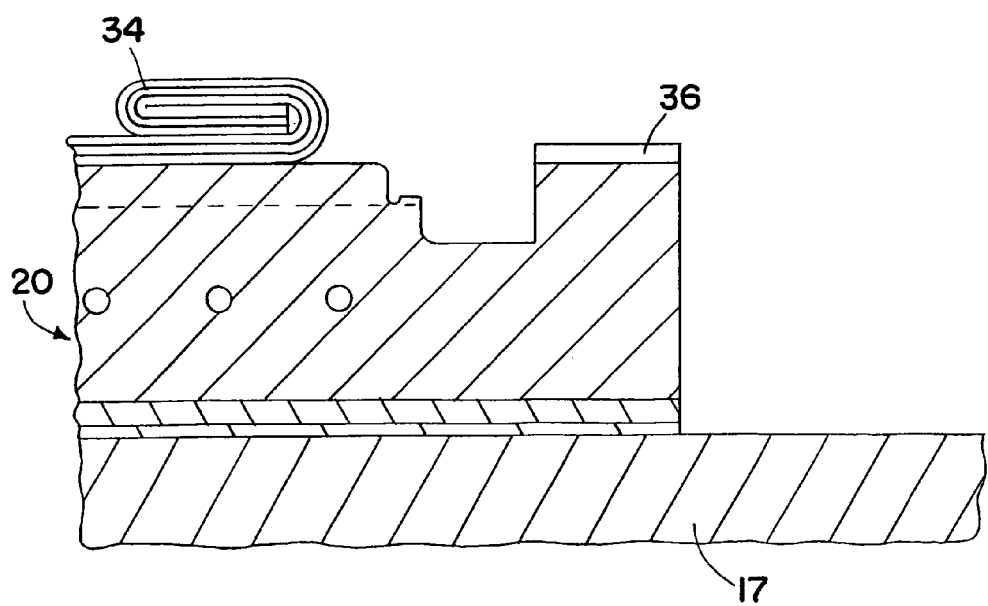
Figure 4:
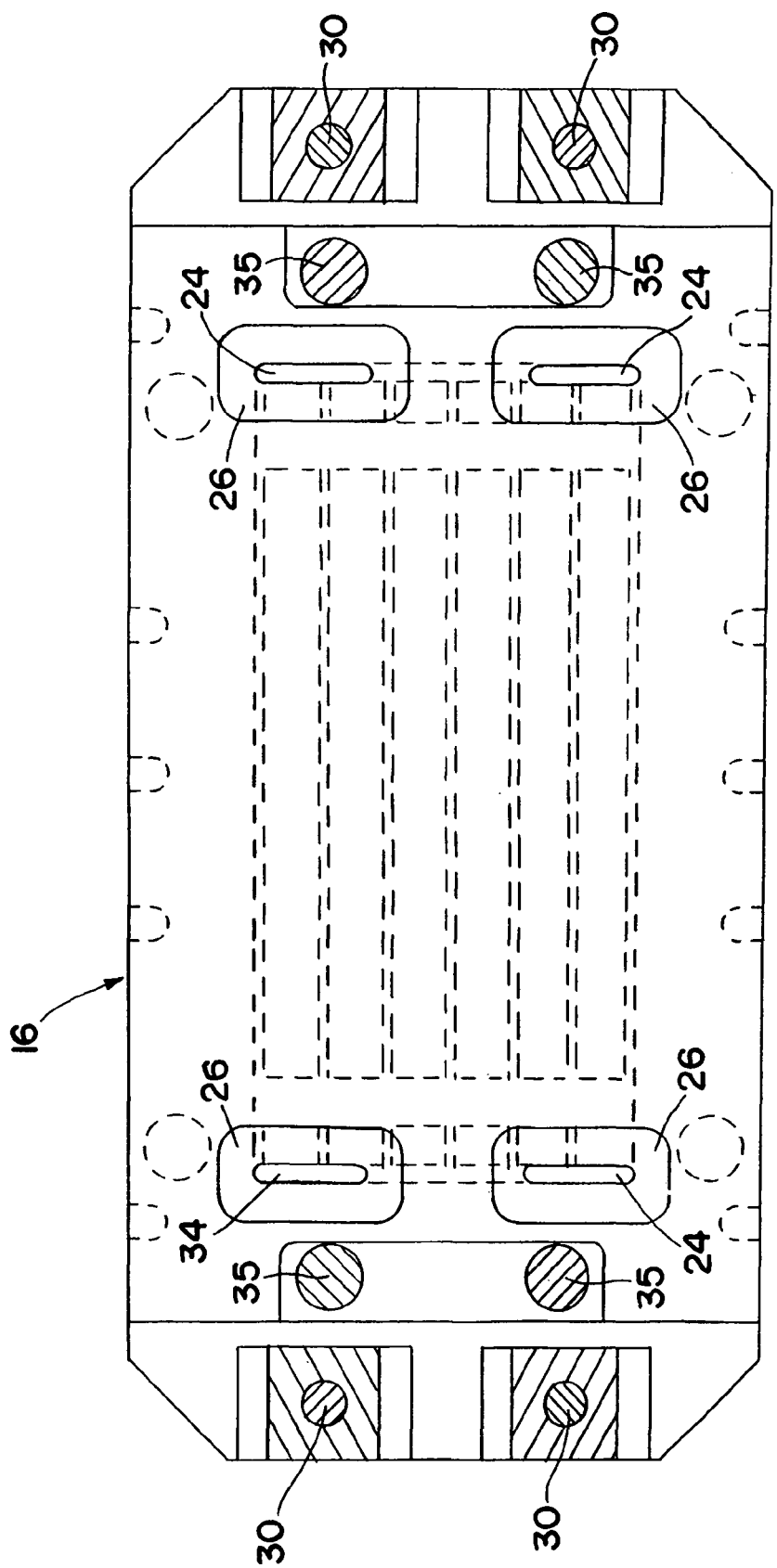
FIG. 4 is a reduced transverse section through the upper mold half of the apparatus of FIG. 3 taken generally along the plane of the line 4-4 thereof.

The method and apparatus of the present invention provide for more precise control of the stacking height of stackable products including for example trays and tote boxes or the like during compression molding of the products off stops to allow large numbers of the products to be stacked one on top of another for handling by automated machinery and the like.

FIGS. 1 and 2 show one such stackable product 1 in the form of a tray 2 including a plurality of stack height surfaces 3 in the form of stacking legs 4 having pockets 5 in their upper ends shaped to closely receive the lower ends 6 of the stacking legs of another tray to provide a registration for the trays when stacked one on top of another. In the embodiment shown in FIGS. 1 and 2, the tray includes a bottom wall 7 having a plurality of transverse and longitudinal ribs 8, 9 on the bottom side thereof and a side wall 10 extending around the entire periphery of the tray. However, it should be understood that other stackable products of different sizes, shapes and types including tote boxes and the like may also be made to have very precise stack height tolerances, for example on the order of ±0.004 inch, during compression molding of the products off stops using the method and apparatus of the present invention.

One such apparatus 15 is schematically shown in FIGS. 3-7, and includes a compression mold 16 mounted in a hydraulic press 17 for opening and closing of the two mold halves 18 and 20. One of the mold halves 18, in this case the mold cavity, is held stationary by the press while the other mold half 20, in this case the mold core, is movable by the press to open and close the mold.

Figure 5:
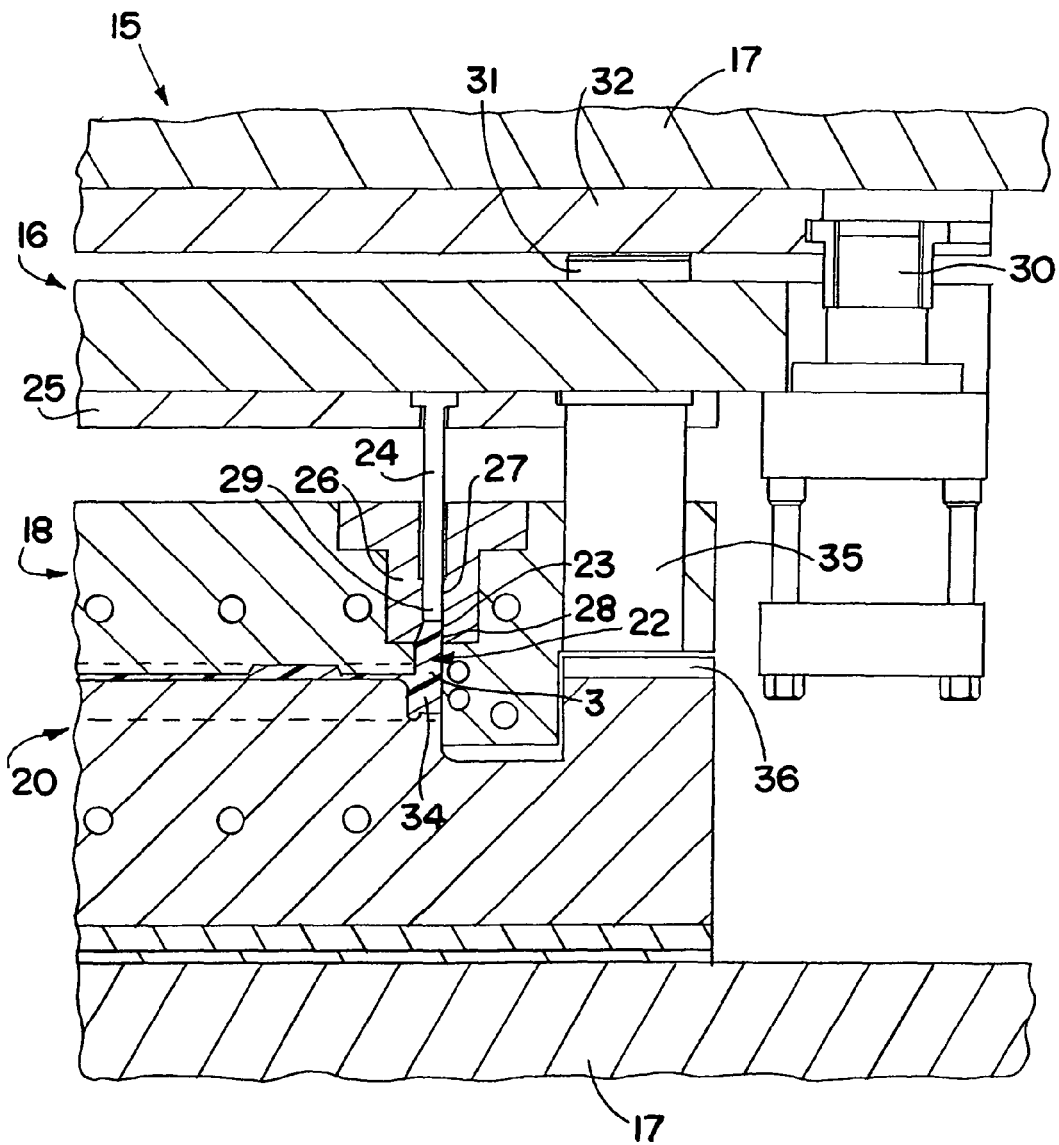
FIG. 5 is a fragmentary section similar to FIG. 3 but showing the compression mold closing under pressure of the molding press causing the charge of molding compound to flow freely throughout the mold cavity.

During closing of the mold, the mold core 20 extends into the mold cavity 18 as shown in FIG. 5 to provide a plurality of blind pockets 22 that form the stack height surfaces of the product during the compression molding process. In this case the mold includes four blind pockets 22 that form the four stacking legs 4 of the tray 2 shown in FIGS. 1 and 2. The outermost ends 23 of the portions of the blind pockets contained in the fixed mold half 18 are closed by four slides 24 supported by a common travel plate 25 for limited travel of all of the slides into and out of the ends of the blind pockets to provide height control of the stack height surfaces as described hereafter. These slides 24 may be guided during their movement by hardened bushings 26 in the fixed mold half 18 that have openings 27 in which the slides are closely slidably received. The innermost ends 28 of the openings 27 may form the outermost ends 23 of the blind pockets 22 in the fixed mold half. The innermost ends 29 of the slides 24 have the same perimeter shape (e.g., footprint) as the ends 6 of the stacking height surfaces 3 of the product 1 that are formed during the compression molding process. Movement of the slides 24 is controlled by a plurality of cylinders 30 operatively connected to the travel plate 25 that supports all of the slides.

At the beginning of the molding cycle, the mold 16 is open and the slides 24 are hydraulically held in the retracted position against stops 31 on an ejector box back up plate 32 as schematically shown in FIG. 3. The extent of travel of the slides 24 away from the mold cavity 18 may be adjusted by using shims 33 to shim the travel plate stops 31. A charge 34 of a suitable fiberglass reinforced plastic molding compound is then placed on the center of the mold core 20 as further shown in FIG. 3. Next the mold 16 is closed under pressure of the molding press 17 to cause the charge of molding compound to flow freely into all areas of the mold including the blind pockets 22 that form the stack height surfaces as schematically shown in FIG. 5. The press travel is limited by encountering resistance from the material charge 34 under compression to insure that the molding compound completely fills the mold, which substantially reduces porosity in the molded product.

Figure 6:
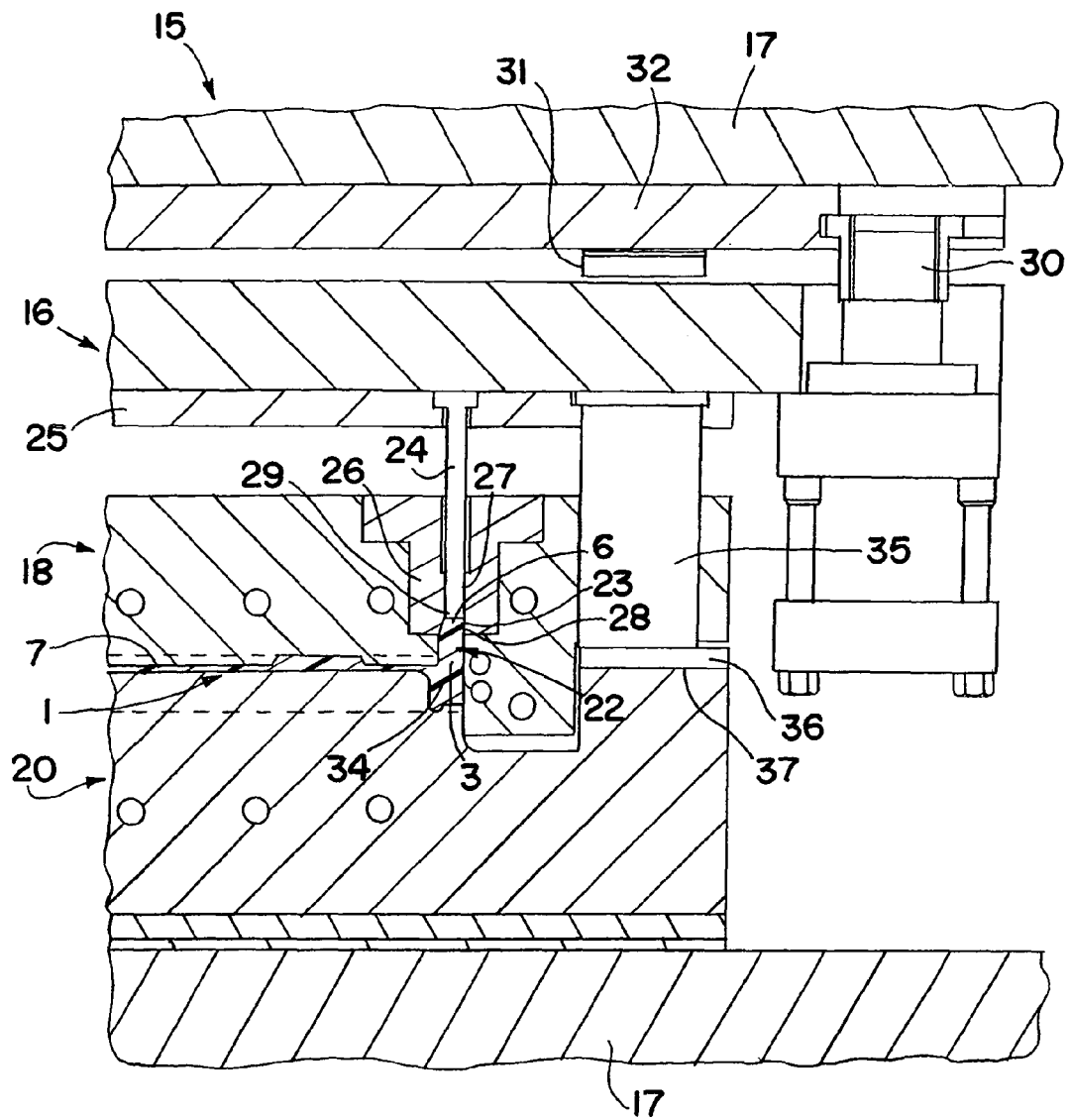
FIG. 6 is a fragmentary section similar to FIG. 5 but showing slides extended a precise amount into one end of blind pockets in the mold cavity to compress all of the product stack height surfaces to a precise height after the mold is closed and the mold cavity has been completely filled with charge material.

During mold closure the slides 24 are retracted to insure that the pressure of the molding press forces the material charge throughout the mold cavity. This takes a relatively short period of time, for example, approximately five seconds into the molding cycle. At that time the slide cylinders 30 are activated to cause the slides 24 to travel inwardly against the outer ends 6 of the stack height surfaces 3 of the product/part being molded until push back pins 35 on the travel plate 25 contact stops 36 on the movable mold half 20 as shown in FIG. 6. During this inward travel, the displacement of the charge material 34 by the slides creates a local high pressure area at the ends 6 of the stack height surfaces 3 to density these areas. This virtually eliminates porosity at the ends of the stack height surfaces for increased strength and enhanced abrasiveness in the areas of greatest wear and minimizes or substantially eliminates scrap and secondary operations that were previously required to patch non-fills and porosity in the stack height surfaces.

The stroke distance of the slides 24 must be sufficient to provide the desired compaction of the stack height surfaces 3 and obtain the desired precise height of the stack height surfaces but not so great as to cause ripple or laking at other surfaces of the molded product. Also the slide activation pressure must be sufficient to provide slide travel until the push back pins 35 contact the stops 36 on the movable mold half 20, but not so great as to substantially reduce the molding pressure on the other surface areas of the molded product.

At the end of the slide travel, the precise height of the stack height surfaces 3 is achieved regardless of the bottom thickness 7 of the product 1 being molded. This height may be adjusted for example to within a tolerance of ±0.004 inch using shims 37 to shim the stops 36 on the movable mold half. The reason the slides 24 cannot be activated until the mold is closed and the charge material flows to fill out the mold is that if the slides are extended too soon, they will move into the blind pockets 22 too far because the stops 36 for the slides are on the movable mold half 20.

These large slides 24 that are used to provide local thickness/height control of the stack height surfaces of the molded product also provide effective venting control of any trapped air from the blind pockets 22 of the mold around the slides. This substantially eliminates dieseling of any combustible vapors that might otherwise become trapped in the blind pockets.

Figure 7:
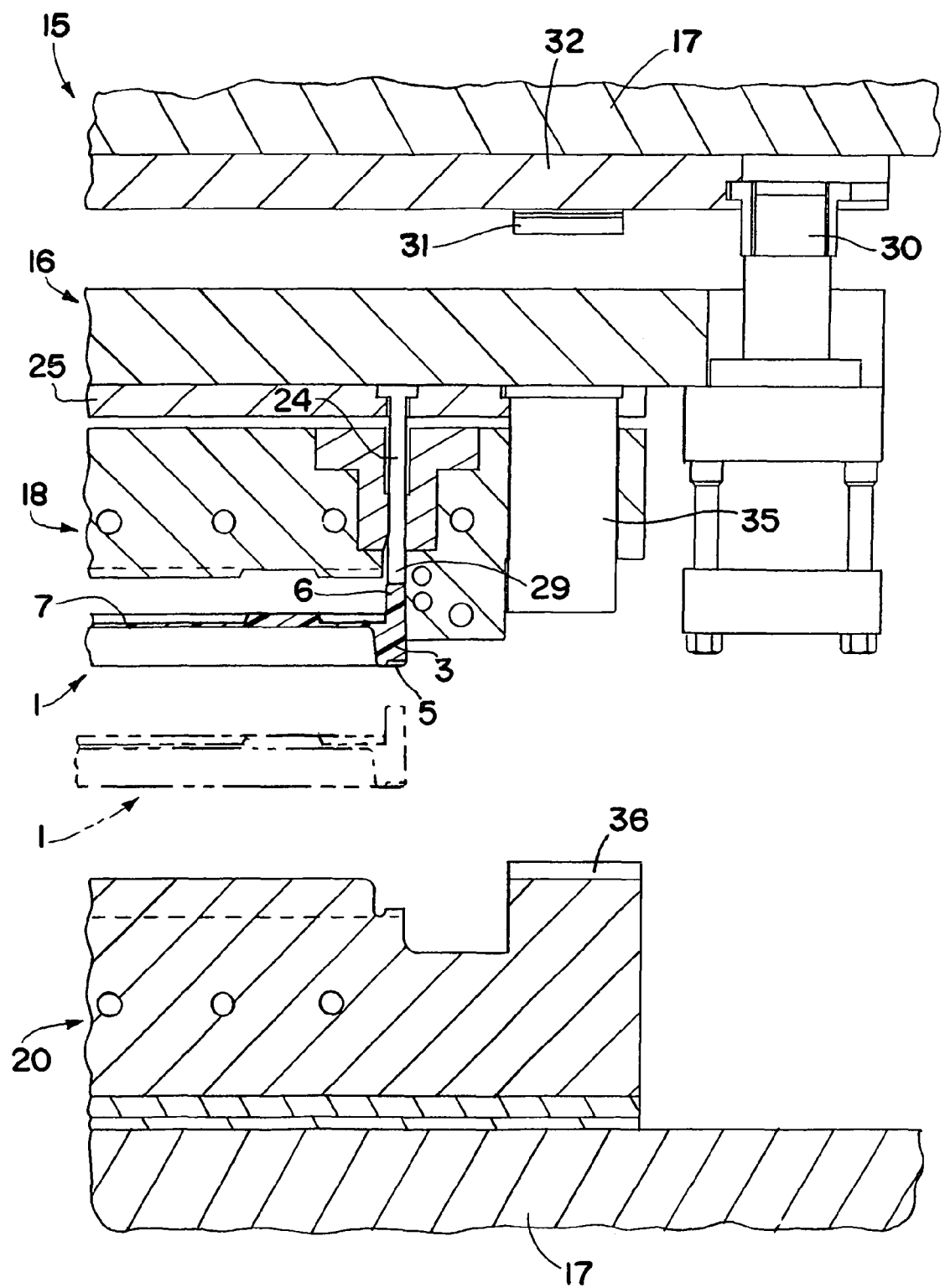
FIG. 7 is a fragmentary section showing the mold of FIG. 6 fully open and the slides fully extended to eject the molded stackable product from the mold cavity.

At the end of the molding cycle, but before the mold is opened, the pressure acting on the slides 24 is relaxed in order to keep the molded part 1 in the mold cavity during opening of the mold. After the mold is fully opened, the hydraulic cylinders 30 may be activated to cause the slides 24 to act as product ejectors, ejecting the product 1 from the mold cavity as schematically shown in FIG. 7. Thereafter, the slides 24 may once again be fully retracted to the FIG. 3 position, readying the mold for the next molding cycle.

After the product 1 is removed from the mold, some light sanding may be required to remove any flashing from the product and to remove any sharp edges, especially the sharp edges created at the ends 6 of the stack height surfaces 3 by the slides 24.

From the foregoing, it will be apparent that the stacking height of stackable products may be precisely controlled during compression molding of stackable products off stops utilizing the method and apparatus of the present invention. Also the apparatus may include new molds incorporating the invention as part of the original mold design, or existing molds may be retrofitted to include the invention of the present application.

Although the invention has been shown and described with respect to certain embodiments, it is obvious that equivalent alterations and modifications will occur to others skilled in the art upon the reading and understanding of the specification. In particular, with regard to the various functions performed by the above-described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one embodiment, such feature may be combined with one or more other features as may be desired and advantageous for any given or particular application.

What is claimed is:

1. A method of controlling the height of stack height surfaces of stackable products during compression molding of the products off stops comprising the steps of placing a charge of molding compound in a compression mold while the mold is open, closing the mold to apply pressure to the molding compound causing the molding compound to flow to the shape of a mold cavity inside the mold that includes blind pockets that form the stack height surfaces during the molding cycle, and extending slides into an end of the blind pockets the same distance after the mold has been closed a predetermined length of time to compress the molding compound and obtain the desired height of the stack height surfaces formed by the blind pockets.

2. The method of claim 1 wherein the slides are held in a retracted position during initial closing of the mold.

3. The method of claim 2 wherein the mold includes a fixed mold half and a movable mold half, and the slides are axially slidable in openings in the fixed mold half in alignment with the ends of the respective blind pockets.

4. The method of claim 3 wherein the slides have the same perimeter shape as the ends of the stack height surfaces contacted thereby during extension of the slides into the blind pockets and provide venting control of any trapped air from the blind pockets through clearance spaces around the slides.

5. The method of claim 1 wherein all of the slides are simultaneously extended into the ends of the respective blind pockets.

6. The method of claim 1 wherein the slides create high pressure areas in the ends of the stack height surfaces contacted thereby during extension of the slides into the ends of the respective blind pockets which densify the molding compound to minimize non-fills and porosity in the stack height surfaces.

7. The method of claim 1 wherein the mold includes a fixed mold half and a movable mold half, and the extension of the slides into the blind pockets after closing of the mold is limited by push back pins on a common travel plate for all of the slides contacting stops on the movable mold half when the mold is closed.

8. The method of claim 7 wherein the stops on the movable mold half are shimmible to adjust the distance that the slides move into the ends of the respective blind pockets when the mold is closed.

9. The method of claim 1 wherein the pressure that is applied to the slides to cause the slides to extend into the ends of the respective blind pockets is relaxed before the mold is opened in order to keep the molded product in the mold cavity during opening of the mold.

10. The method of claim 9 wherein the slides are further extended after the mold is fully opened to eject the molded product from the mold.

\* \* \* \* \*